US008843763B2

(12) United States Patent
Nobukata (10) Patent No.: US 8,843,763 B2
(45) Date of Patent: Sep. 23, 2014

(54) INTEGRATED CIRCUIT AND ELECTRONIC APPARATUS

(75) Inventor: Hiromi Nobukata, Kanagawa (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 12/878,100

(22) Filed: Sep. 9, 2010

(65) Prior Publication Data

US 2011/0072277 A1 Mar. 24, 2011

(30) Foreign Application Priority Data

Sep. 18, 2009 (JP) ................................ P2009-217482

(51) Int. Cl.
*H04L 29/06* (2006.01)
*G06K 19/07* (2006.01)
*G06F 21/77* (2013.01)
*G06F 21/60* (2013.01)
*G06K 19/073* (2006.01)

(52) U.S. Cl.
CPC ............ *G06K 19/0723* (2013.01); *G06F 21/77* (2013.01); *G06F 21/60* (2013.01); *G06K 19/07363* (2013.01)
USPC ........................................................ 713/189

(58) Field of Classification Search
CPC ..... G06F 21/60; G06F 21/77; G06K 19/0723; G06K 19/07363
USPC ........................................................ 713/189
See application file for complete search history.

(56) References Cited

U.S. PATENT DOCUMENTS

| | | | |
|---|---|---|---|
| 6,581,841 B1 * | 6/2003 | Christoffersen | 235/492 |
| 6,795,837 B1 * | 9/2004 | Wells | 708/3 |
| 2007/0008672 A1 * | 1/2007 | Ohshima | 361/93.1 |
| 2009/0001821 A1 * | 1/2009 | Walker et al. | 307/413 |

FOREIGN PATENT DOCUMENTS

| | | |
|---|---|---|
| JP | 2000 196584 | 7/2000 |
| JP | 2004-78838 | 3/2004 |
| JP | 2004-78898 | 3/2004 |
| JP | 2006-12159 | 1/2006 |
| JP | 2007-201456 | 8/2007 |
| JP | 2007-220142 | 8/2007 |

* cited by examiner

*Primary Examiner* — Michael S McNally
(74) *Attorney, Agent, or Firm* — Frommer Lawrence & Haug LLP; William S. Frommer (57) ABSTRACT

An integrated circuit includes a semiconductor-circuit layer; metal layers formed on the semiconductor-circuit layer, one of the metal layers being a metal layer in which an active shield is formed; and an antenna formed by patterning in at least one of the metal layers that are below the metal layer in which the active shield is formed. The semiconductor-circuit layer includes an encryption circuit configured to receive a drive voltage and to perform encryption arithmetic; a power-supply circuit configured to provide the drive voltage to the encryption circuit; and a circuit system configured to receive a power-supply voltage from an external power supply.

9 Claims, 8 Drawing Sheets

INTEGRATED CIRCUIT AND ELECTRONIC APPARATUS

BACKGROUND OF THE INVENTION

1. Field of the Invention

The present invention relates to an integrated circuit in which an encryption circuit is incorporated, and an electronic apparatus.

2. Description of the Related Art

Regarding integrated circuit (IC) cards, when sending/receiving of data is performed between the IC cards and host computers, in order to prevent problems from occurring even in a case in which confidential information stored in the IC cards leaks in the course of sending/receiving data, encrypted data is used as data to be send/received.

A method that is most frequently used at present as a method for encrypting such data is the data encryption standard (DES).

In the DES, for encryption of data, the owner of such an IC card and a host computer have the same key. Additionally, in the DES, a sending side for data encrypts the data using the key, and sends the encrypted data. A receiving side for the data decrypts the data using the same key, and extracts a message.

Even when a malicious third party obtains the data in the course of communication secretly, as long as the third party does not have the key, it is very difficult for the third part to decrypt the data and extract the message.

Furthermore, data concerning the key used to perform encryption/decryption is stored in a non-volatile memory, such as an electrically erasable programmable read-only memory (EEPROM), that is provided in the IC card.

At a time of encryption/decryption, control of directly transferring the data concerning the key to an encryption engine that is provided in the IC card without using a central processing unit (CPU) is performed. With this control, a configuration in which even the owner of the IC card or engineers who developed the IC card are not able to extract the data concerning the key is employed, thereby maintaining security.

Two types of IC cards, i.e., a contact IC card and a non-contact IC card, exist.

The contact IC card has a plurality of metallic terminals on the surface thereof. At a time of using the IC card, the IC card is inserted into a reader/writer apparatus. In this case, in the reader/writer apparatus, the metallic terminals are in contact with the reader/writer apparatus. The read/writer apparatus supplies power and signals to the IC card, thereby causing an IC which is provided in the IC card to operate so that a necessary process is performed.

Figure 1:
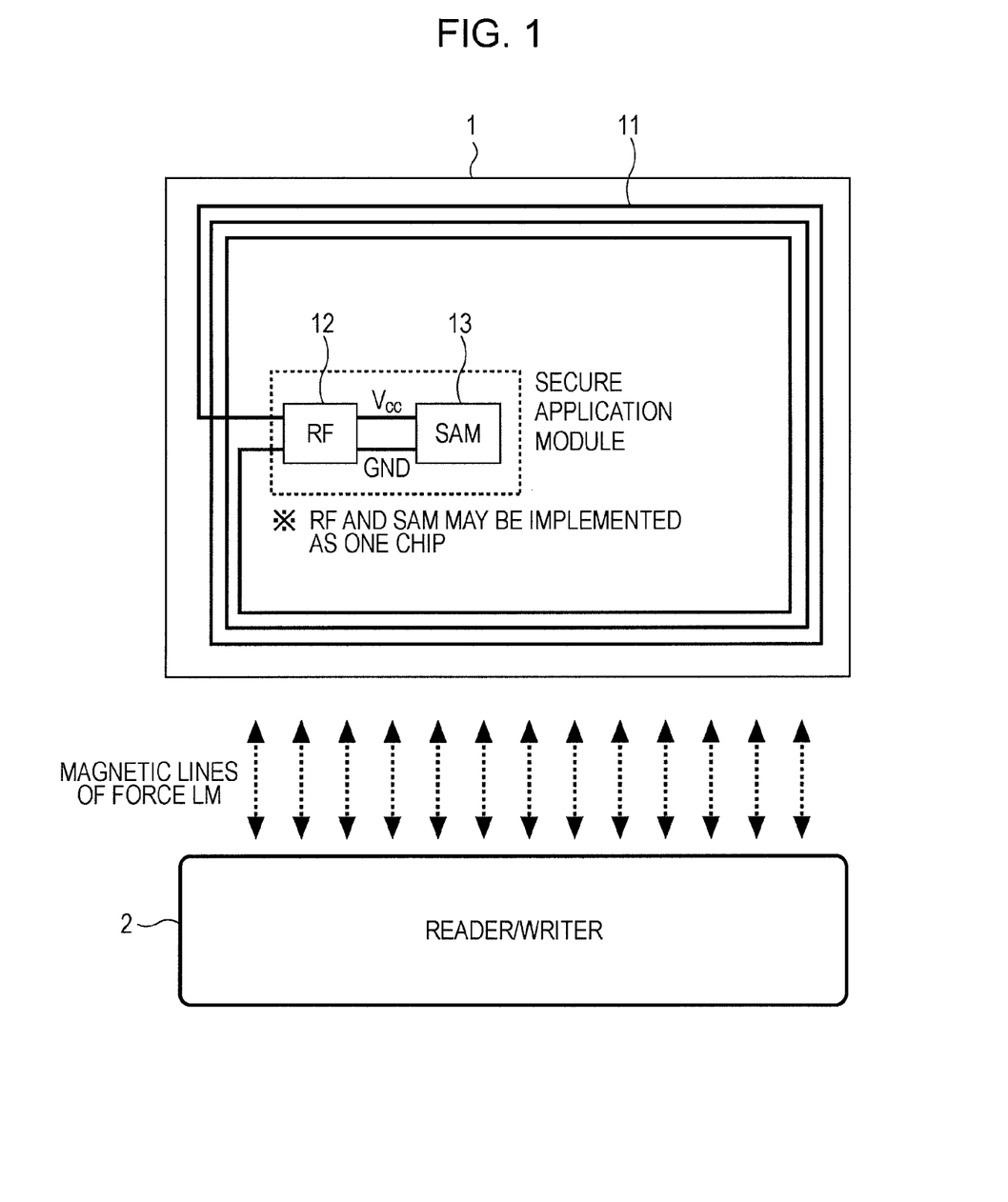
FIG. 1 is a diagram illustrating an example of a configuration in a case in which a non-contract IC card is used.

For the non-contact IC card, for example, a configuration illustrated in FIG. 1 is employed.

An antenna 11 that is disposed in a non-contact IC card 1 receives magnetic lines of force LM from a reader/writer apparatus 2, and converts the magnetic lines of force LM into a signal indicating electromotive force. In this example, the signal is input to a radio frequency (RF) chip 12, and the RF chip 12 extracts a necessary signal.

In the IC card 1, a constant voltage is generated from the electromotive force that is generated in the antenna 11. The constant voltage is supplied to a secure application module (SAM) chip 13 that performs a process associated security, and the SAM chip 13 performs a necessary process.

A result of the process performed by the SAM chip 13 is sent back to the RF chip 12. In the RF chip 12, the result is superimposed on a signal waveform, and is sent back to the reader/writer 2.

In this case, encrypted data is used as a sent/received signal. This ensures security of a system.

However, an attack method (differential power analysis (DPA) attack), in which a consumed current flowing through an IC card is measured and in which a key is extracted by performing a statistical process on the consumed current, has been reported by P. Kocher et al.

In the DPA attack, encryption arithmetic is performed using about 1,000 different clear texts. A consumed current at the time of encryption arithmetic is measured to obtain a waveform thereof. A key is extracted by performing a statistical process on the consumed current.

Similarly, the DPA attack can also be performed on a non-contact IC card. Only the SAM chip that performs a process associated with security is demounted. By supplying power and necessary signals, the SAM chip is caused to operate. Accordingly, the DPA attack can be performed.

Furthermore, when a current that flows through a wiring pattern for output in each circuit in an IC chip changes, a minute magnetic field formed in the vicinity of the wiring pattern changes in accordance with the change in the current.

Figure 2:
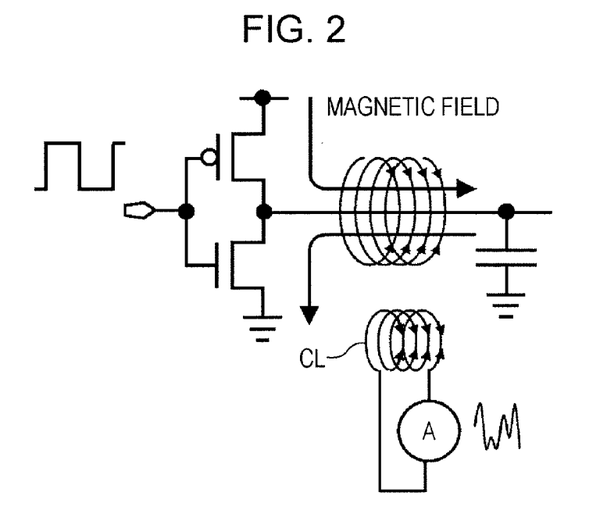
FIG. 2 is a diagram for explaining a method for obtaining a signal indicating magnetic lines of force.

As illustrated in FIG. 2, when a small coil CL is brought near to an IC chip in a state in which the IC chip is mounted in a plastic package that is sealed, a signal indicating magnetic lines of force in a small region in which the coil CL can receive magnetic lines of force can be obtained.

Then, the position of an encryption circuit is estimated using the relationships between signals that are input/output to/from the IC chip and the obtained signal indicating magnetic lines of force. A waveform of a more specific signal indicating the magnetic lines of force is obtained at the position, and a statistical process which is similar to that performed in the DPA attack is performed. If estimation of the position of the encryption circuit is correctly performed, security information, such as information concerning a key, can be obtained.

The above attack is called a differential electro magnetic analysis (DEMA) attack. Regarding the feature of the DEMA attack, an attack that targets one portion of a circuit can be performed using the DEMA attack.

Figure 3:
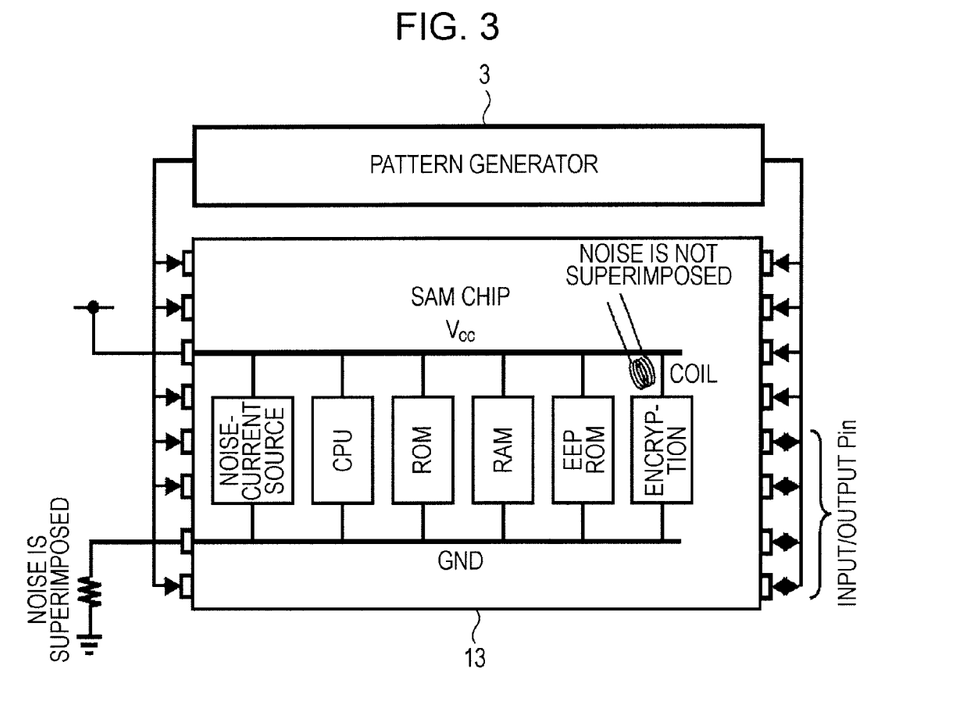
FIG. 3 is a diagram for explaining a feature of the DEMA attack.

FIG. 3 is a diagram illustrating a feature of the DEMA attack.

For example, when a circuit 3 that causes a noise current controlled using a random number to flow is disposed for prevention of the DPA attack, an element indicating the noise current is assuredly superimposed on a waveform of a consumed current.

However, in a case of measurement of magnetic lines of force, the strength of an element of a magnetic field indicated by magnetic lines of force caused by the noise current decreases with a distance from a noise-current source as illustrated in FIG. 3. A signal indicating magnetic lines of force that are not influenced by the noise current can be obtained in a region that is a predetermined distance or more far from the noise-current source.

When a circuit that is a target of the DEMA attack, such as an encryption circuit, exists in the region, a signal indicating magnetic lines of force that are not influenced by the noise current can be obtained.

Methods that are proposed as main defensive methods for the DPA attack and the DEMA attack are as follows. A first method is a method in which an encryption circuit has a complementary configuration, thereby employing a configuration in which a result assuredly changes regardless of clear text data. A second method is a method in which signals are disturbed using random numbers.

When the first method described above is used, a circuit size and an operating current are increased. When the second method is used, because there is a probability that a key will be extracted using a higher-order DPA attack, prevention for the higher-order DPA attack is also necessary.

In each of the first and second methods described above, power with which an IC operates is supplied from a power-supply terminal of the IC. Accordingly, an element indicating a current that is consumed in a circuit operation appears at the power-supply terminal of the IC.

For example, a method disclosed in Japanese Unexamined Patent Application Publication No. 2000-196584 is common as a method in which a current flowing through a particular circuit such as an encryption circuit does not appear at a power-supply terminal of an IC.

Figure 4:
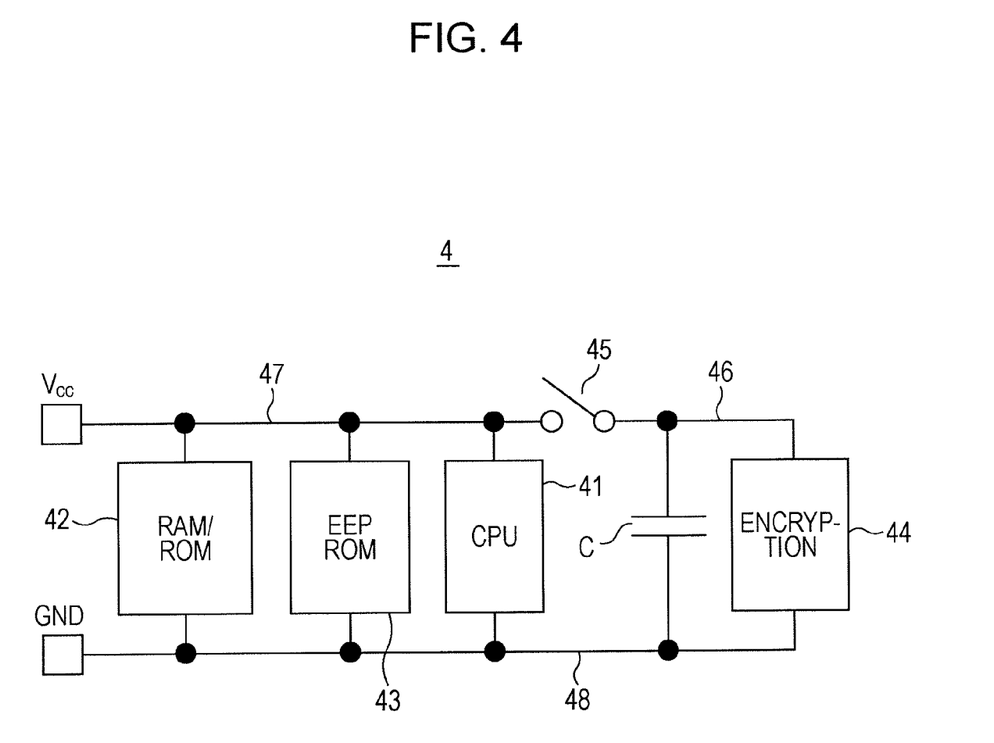
FIG. 4 is a diagram illustrating an example of a configuration of an IC in which the method disclosed in Japanese Unexamined Patent Application Publication No. 2000-196584 is employed.

FIG. 4 is a diagram illustrating an example of a configuration of an IC in which the method disclosed in Japanese Unexamined Patent Application Publication No. 2000-196584 is employed.

An IC 4 includes a CPU 41, a random-access memory (RAM)/read-only memory (ROM) 42, an EEPROM 43, an encryption circuit 44, a capacitor C, and a switch 45.

In the configuration, a power-supply line 46 for the encryption circuit 44 that is provided in the IC 4 is connected via the switch 45 to another power-supply line 47 to which an external power supply is connected.

The capacitor C is disposed between the power-supply line 46 associated with encryption and a ground (GND) line 48. At times of operations other than encryption arithmetic, the switch 45 is turned on, and the capacitor C is charged. Then, at a time of encryption arithmetic, the switch 45 is turned off, and the encryption arithmetic is performed in the encryption circuit 44 using charge in the charged capacitor C.

SUMMARY OF THE INVENTION

In the above configuration, an operating current of the encryption circuit 44 does not appear on the power-supply line in the IC. Accordingly, the DPA attack is not possible.

On the other hand, a minute magnetic field caused by the operating current of the encryption circuit 44 is generated. If no sufficient prevention of the DPA attack is provided for the encryption circuit 44, there is a probability that a key will be extracted using the DEMA attack.

Furthermore, in order to realize encryption arithmetic once using only charge in the charged capacitor C, it is necessary to prepare a capacitor having a considerable capacity.

It is desirable to provide an integrated circuit that is capable of having resistance to the DPA attack because a large capacitor is not necessary and because an operating current of an encryption circuit does not appear on a power-supply line of the integrated circuit and that is capable of having resistance to the DEMA attack because it is difficult to measure a magnetic field associated with a circuit operation, and to provide an electronic apparatus.

An integrated circuit according to a first embodiment of the present invention includes the following elements: a semiconductor-circuit layer; metal layers formed on the semiconductor-circuit layer, one of the metal layers being a metal layer in which an active shield is formed; and an antenna formed by patterning in at least one of the metal layers that are below the metal layer in which the active shield is formed. The semiconductor-circuit layer includes the following elements: an encryption circuit configured to receive a drive voltage and to perform encryption arithmetic; a power-supply circuit configured to provide the drive voltage to the encryption circuit; and a circuit system configured to receive a power-supply voltage from an external power supply.

An electronic apparatus according to a second embodiment of the present invention includes an integrated circuit having an encryption circuit. The integrated circuit includes the following elements: a semiconductor-circuit layer; metal layers formed on the semiconductor-circuit layer, one of the metal layers being a metal layer in which an active shield is formed; and an antenna formed by patterning in at least one of the metal layers that are below the metal layer in which the active shield is formed. The semiconductor-circuit layer includes the following elements: an encryption circuit configured to receive a drive voltage and to perform encryption arithmetic; a power-supply circuit configured to provide the drive voltage to the encryption circuit; and a circuit system configured to receive a power-supply voltage from an external power supply.

According to the embodiments of the present invention, resistance to the DPA attack can be realized because a large capacitor is not necessary and because an operating current of the encryption circuit does not appear on a power-supply line of the integrated circuit, and resistance to the DEMA attack can be realized because it is difficult to measure a magnetic field associated with a circuit operation.

DESCRIPTION OF THE PREFERRED EMBODIMENTS

Hereinafter, embodiments of the present invention will be described with reference to the accompanying drawings.

Note that the description will be made in the order of section headings as follows:
1. First Embodiment
2. Second Embodiment 1. First Embodiment Parts (A) to (C) of FIG. 5 are diagrams illustrating an example of a security semiconductor LSI, which has an encryption processing circuit, according to a first embodiment of the present invention.

A security LSI 100 is formed as a non-conduct IC card that is an electronic device.

Figure 5:
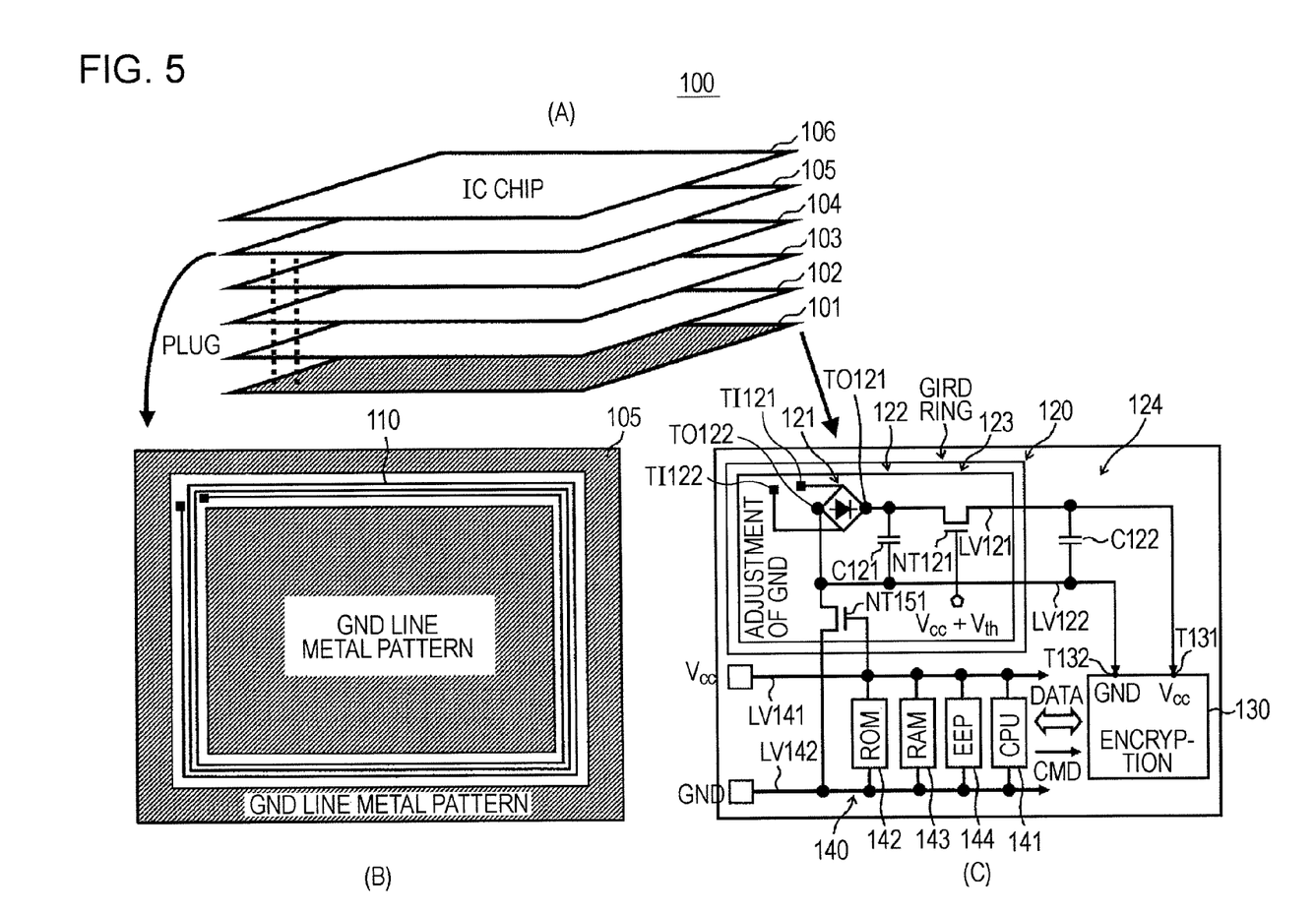
FIG. 5 includes diagrams illustrating an example of a configuration of a security semiconductor large scale integrated circuit (LSI), which has an encryption processing circuit, according to a first embodiment of the present invention.

For example, as illustrated in part (A) of FIG. 5, the security LSI 100 according to the first embodiment that is illustrated as an example is formed using a semiconductor layer (a silicon (Si) layer) and five metal layers which are formed on the semiconductor layer and in which metal wiring patterns are formed, thereby configuring an IC chip in which a semiconductor circuit is formed.

A configuration and function is assigned to each of the metal layers, for example, as described below.

The configuration and function of a layer in which signal lines in the horizontal direction are formed is assigned to a first metal layer (1MT) 102 formed on an Si layer 101.

The configuration and function of a layer in which signal lines in the vertical direction are formed is assigned to a second metal layer (2MT) 103 formed on the first metal layer 102.

The configuration and function of a layer in which power-supply lines and dummy metal patterns are formed is assigned to a third metal layer (3MT) 104 formed on the second metal layer 103.

The configuration and function of a layer in which lines connected to the ground and dummy metal patterns are formed is assigned to a fourth metal layer (4MT) 105 formed on the third metal layer 104.

The configuration and function of a layer in which an active shield is formed is assigned to a fifth metal layer (5MT) 106 formed on the fourth metal layer 105.

The active shield formed in the fifth metal layer 106 that is the top layer among the five metal layers is formed as a pattern in which signal lines having the minimum line width are disposed at the minimum intervals. With the active shield, disconnection or short of a signal line that is caused by a process using a focused ion beam (FIB) or the like.

Lines connected to the ground (reference-power-supply lines and ground lines) and power-supply lines are disposed in the fourth metal layer 105 and the third metal layer 104, respectively. Additionally, dummy metal patterns are disposed in empty spaces.

The dummy metal patterns are light-shielding patterns for dealing with the DPA attack using radiation of a laser beam.

In this case, for example, as illustrated in part (B) of FIG. 5, a predetermined region is reserved in the fourth metal layer 105, and a metal antenna pattern 110 (hereinafter, referred to as a "metal antenna 110") is disposed.

On the other hand, in the Si layer 101, for example, as illustrated in part (C) of FIG. 5, a power-supply circuit 120, an encryption circuit 130, and a processing circuit 140 that serves as a circuit system are formed.

The power-supply circuit 120 includes a rectifying circuit 121 configured using a diode bridge, a smoothing circuit 122 configured using a capacitor C121, a constant-voltage-generating circuit 123 configured using a n-channel metal-oxide-semiconductor (NMOS) transistor NT121, and a capacitor C122 for stabilizing a voltage that is output from the constant-voltage-generating circuit 123. A stabilization unit 124 that stabilizes the voltage is configured using the capacitor C122.

A first input terminal T1121 and a second input terminal T1122 of the rectifying circuit 121 are connected to the metal antenna 110 formed in the fourth metal layer 105.

The power-supply circuit 120 has a first power-supply line LV121 and a first GND line (reference-power-supply line) LV122 that are different from a power-supply line and a ground line for the processing circuit 140. One of two ends of the first power-supply line LV121 is connected to a first output terminal TO121 of the rectifying circuit 121 via the NMOS transistor NT121. One of two ends of the first GND line LV122 is connected to a second output terminal TO122 of the rectifying circuit 121.

The other end of the first power-supply line LV121 is connected to a power-supply terminal T131 of the encryption circuit 130. The other end of the first GND line LV122 is connected to a GND terminal T132 of the encryption circuit 130.

As described above, an output of the power-supply circuit 120 is connected only to the power-supply terminal of the encryption circuit 130. In other words, the encryption circuit 130 receives provision of a drive voltage only from the power-supply circuit 120.

By employing the above-described configuration, electromotive force indicated by magnetic lines of force which are received by the metal antenna 110 is converted into a constant voltage. The constant voltage is used as a voltage of a power supply with which the encryption circuit 130 operates.

As illustrated in part (C) of FIG. 5, the processing circuit 140 includes a CPU 141 that serves as a control unit which performs overall control of the processing circuit 140, a mask ROM 142, an RAM 143, and a non-volatile memory (EEPROM) 144.

A circuit system is configured using the CPU 141, the mask ROM 142, the RAM 143, and so forth.

Furthermore, the processing circuit 140 in the first embodiment has a second power-supply line LV141 and a second GND line LV142 which are different from the power-supply line and the ground line of the power-supply circuit 120 and through which an external-power-supply voltage "$V_{cc}$" is provided from an external power supply.

The CPU 141 performs overall control of the security LSI 100 that is a non-contact IC card, in accordance with a program stored in the mask ROM 142 or by accessing the RAM 143.

The CPU 41 has a function of issuing an encryption command to the encryption circuit 130 and so forth.

Note that, in this example, a configuration is employed, in which the metal antenna 110 is disposed only in the fourth metal layer 105 that is used as a layer in which GND wiring patterns are formed.

However, the configuration for a metal antenna is not limited thereto. A metal antenna can also be disposed in a region of the third metal layer 104 that is used as a layer in which power-supply wiring patterns are formed. The metal antenna 110 in the fourth metal layer 105 and the metal antenna in the third metal layer 104 can be connected to each other, and the two metal antennas can also be used as one antenna.

Note that, in the power-supply circuit 120, a high voltage that is equal to or higher than the external-power-supply voltage $V_{cc}$ is applied to a path from the rectifying circuit 121 to the constant-voltage-generating circuit 123. Accordingly, high-voltage transistors are necessary.

However, in a case in which an EEPROM is used as a non-volatile memory in which security information such as information concerning an encryption key is stored, erasing/writing of data from/into the EEPROM is performed using a high voltage that is equal to or higher than the external-power-supply voltage $V_{cc}$. Accordingly, high-voltage transistors are prepared.

Thus, when the prepared high-voltage transistors are also used for the path, addition of a new process for preparation of high-voltage transistors is not necessary.

Furthermore, the high voltage is periodically applied to the path at a frequency at which magnetic lines of force change. Accordingly, in order to prevent malfunction of the CPU 141 and the other circuits, which are disposed on the same chip, that is caused by a signal having the high voltage, it is preferable that components along the path be disposed in a region having a well separated from a well for the CPU 141 and the other circuits so that the components are electrically separated from the CPU 141 and the other circuits.

The basic overall configuration of the security LSI 100 according to the first embodiment is described above.

Next, a configuration of a more specific circuit for generating a constant voltage in the security LSI 100 according to the first embodiment and an operation of the circuit will be described.

Figure 6:
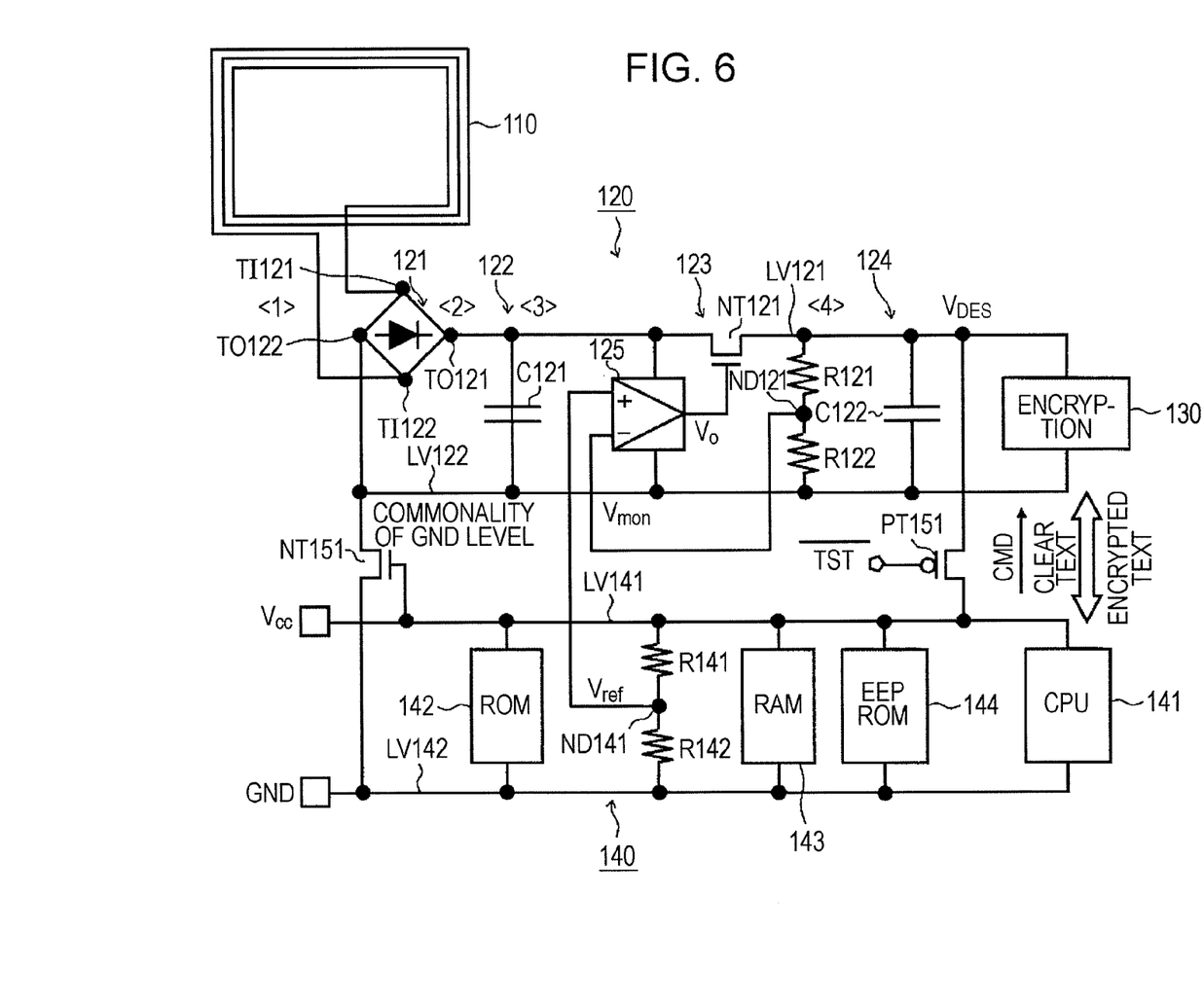
FIG. 6 is a diagram illustrating a configuration of a more specific circuit for generating a constant voltage in the security LSI according to the first embodiment.

FIG. 6 is a diagram illustrating a configuration of a more specific circuit for generating a constant voltage in the security LSI 100 according to the first embodiment.

Figure 7:
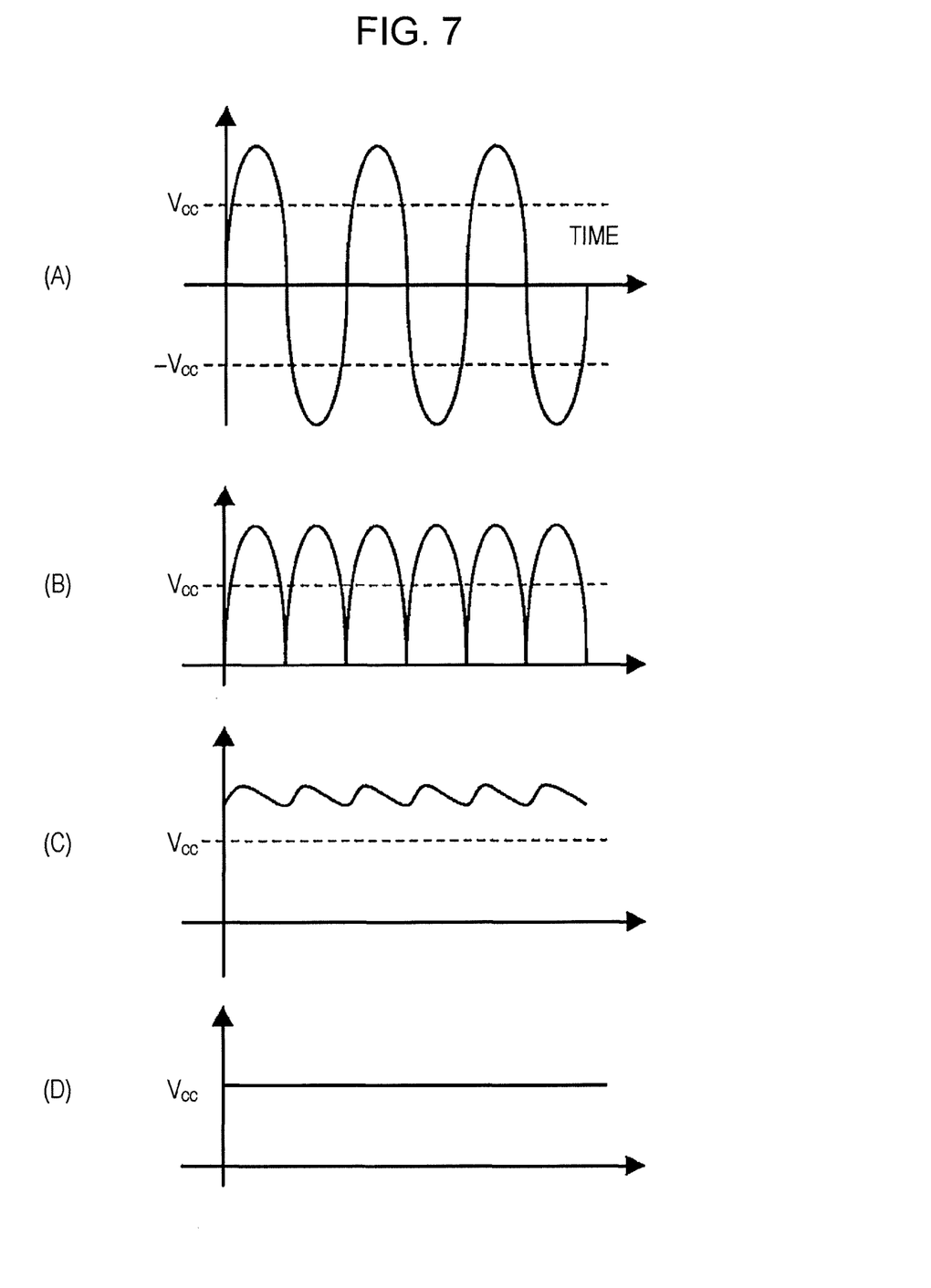
FIG. 7 includes timing diagrams for explaining an operation.

Parts (A) to (D) of FIG. 7 are timing diagrams for explaining an operation of the circuit illustrated in FIG. 6.

In the circuit illustrated in FIG. 6, a comparator 125, resistors R121 and R122, resistors 8141 and R142, an NMOS transistor NT151, and a p-channel metal-oxide-semiconductor (PMOS) transistor PT151 are provided in addition to the components included in the configuration illustrated in part (C) of FIG. 5.

The resistors R121 and R122 are connected in series between the first power-supply line LV121 and the first GND line LV122 of the power-supply circuit 120. A connection node ND121 that is common to both the resistors R121 and R122 is connected to an inverting input terminal (−) of the comparator 125.

The resistors R141 and R142 are connected in series between the second power-supply line LV141 and the second GND line LV142 of the processing circuit 140. A connection node ND141 that is common to both the resistors 8141 and R142 is connected to a non-inverting input terminal (+) of the comparator 125.

The second output terminal TO122 of the rectifying circuit 121 of the power-supply circuit 120 and the second GND line LV142, which is connected to the external power supply, of the processing circuit 140 are connected to the source and drain of the NMOS transistor NT151, respectively.

The gate (control terminal) of the NMOS transistor NT151 is connected to the second power-supply line LV141 that is a line through which the external-power-supply voltage $V_{cc}$ is provided.

With this configuration, GND levels of the power-supply circuit 120 and the processing circuit 140 which are two blocks are controlled so that the GND levels will be the same level.

Furthermore, as described above, in the power-supply circuit 120, the NMOS transistor NT121, with which the constant-voltage-generating circuit 123 is configured, is disposed on the first power-supply line LV121. The output of the comparator 125 is connected to the gate (control terminal) of the NMOS transistor NT121.

The comparator 125 compares a voltage that is obtained by dividing the external-power-supply voltage $V_{cc}$ using the resistors R141 and R142 with a voltage that is obtained by dividing a voltage "$V_{DES}$", which is output from the constant-voltage-generating circuit 123, using the resistors R121 and R122. In accordance with a result of comparison, the comparator 125 controls whether the NMOS transistor NT121 is turned on or off, thereby controlling the voltage output from the constant-voltage-generating circuit 123 so that the voltage will be a predetermined voltage.

Moreover, the first power-supply line LV121, through which the voltage "$V_{DES}$" that is output from the constant-voltage-generating circuit 123 and that is a voltage across the stabilization unit 124 is provided, and the second power-supply line LV141, through which the external-power-supply voltage $V_{cc}$ is provided, are connected to the source and drain of the PMOS transistor PT151, respectively.

The gate of the PMOS transistor PT151 is connected to a line through which a control signal "$\overline{\text{TST}}$" is supplied.

In a state in which the IC chips are formed on a wafer, power that is supplied to each of the IC chips is power supplied from a measuring apparatus such as a tester. Because it is difficult to consider an environment in which magnetic lines of force can be provided to the IC chip, no power is supplied to the encryption circuit 130 that operates using power from the metal antenna 110. Accordingly, it is difficult to perform test associated with encryption.

In order to prevent the test associated with encryption from not being performed, in the first embodiment, a configuration is employed, in which the external-power-supply voltage $V_{cc}$ is provided to the encryption circuit 130 by setting the level of the control signal "$\overline{\text{TST}}$" to be low at least in the state in which the IC chips are formed on a wafer.

In this case, in the power-supply circuit 120, no power is supplied to the path, which includes the comparator 125, from the rectifying circuit 121 to the constant-voltage-generating circuit 123. Accordingly, the level of a signal "$V_o$" that is output from the comparator 125 is set to be low, thereby turning off the NMOS transistor NT121. Thus, provision of the external-power-supply voltage to the constant-voltage-generating circuit in the reverse direction does not occur.

Then, an operation of fixing the level of the control signal "$\overline{\text{TST}}$" to be high is performed in a certain process before shipment. Regarding the voltage "$V_{DES}$" after the operation has been performed, the stabilized voltage "$V_{DES}$" is separated from the external power supply. Accordingly, only a voltage that is generated as a constant voltage from the electromotive force generated in the metal antenna 110 is provided to the encryption circuit 130.

Furthermore, a built-in fuse (In-fuse) may be used instead of the PMOS transistor PT151, and a configuration in which the In-fuse is cut in a certain process before shipment may be employed.

Next, an operation of the power-supply circuit 120 will be described with reference to parts (A) to (D) of FIG. 7.

Regarding the electromotive force generated in the metal antenna 110, when a magnetic flex of magnetic lines of force is denoted by $\phi B$ [Wb] and the number of turns in an antenna coil is denoted by N [turns], the electromotive force $\epsilon$ [V] is represented by the following equation in accordance with the law of electromagnetic induction. A voltage signal indicating the electromotive force has a waveform illustrated in part (A) of FIG. 7.

$$\varepsilon = -N\frac{d\phi B}{dt} \qquad \text{Equation 1}$$

When the voltage signal has passed the rectifying circuit 121, the voltage signal has a waveform illustrated in part (B) of FIG. 7. Then, using the smoothing capacitor C121 of the smoothing circuit 122, the voltage signal has a waveform illustrated in part (C) of FIG. 7. The voltage signal is applied to the drain of the NMOS transistor NT121.

The gate of the NMOS transistor NT121 is connected to the output of the comparator 125. A voltage $V_{ref}$, which is represented by the following equation indicating division of the external-power-supply voltage using resistors, is provided to an input (+), which is one of two inputs, of the comparator 125 on a reference side.

$$V_{ref} = \frac{R2}{R1 + R2} \cdot V_{cc} \quad \text{Equation 2}$$

Here, R1 and R2 denote a resistor value of the resistor R141 and a resistor value of the resistor R142, respectively.

A voltage $V_{mon}$, which is represented by the following equation indicating division of the voltage "$V_{DES}$" output from the constant-voltage-generating circuit 123 using resistors, is applied to the other input (−) of the comparator 125.

$$V_{mon} = \frac{R4}{R3 + R4} \cdot V_{DES} \quad \text{Equation 3}$$

Here, R3 and R4 denote a resistor value of the resistor R121 and a resistor value of the resistor R122, respectively.

For example, when an equation R1/R2=R3/R4 is true, the following control is performed in the power-supply circuit 120.

When a relationship $V_{DES}<V_{cc}$ is true, the level of the signal $V_o$ output from the comparator 125 is high. Accordingly, the NMOS transistor NT121 is turned on, and control of supplying charge to the stabilization unit 124 is performed.

When a relationship $V_{DES}>V_{cc}$ is true, the level of the signal $V_o$ output from the comparator 125 is low. Accordingly, the NMOS transistor NT121 is turned off, and control of stopping supply of charge is performed.

Thus, control is performed so that the voltage $V_{DES}$ which is provided to the power-supply terminal of the encryption circuit 130 will coincide with the external-power-supply voltage $V_{cc}$, thereby obtaining a waveform illustrated in part (D) of FIG. 7.

Therefore, the CPU 141 and the encryption circuit 130 operate using power supplies that supply substantially the same voltage value, and can directly be connected to each other without providing a level shift circuit or the like therebetween.

In the above configuration, when data necessary for arithmetic and an arithmetic start command are issued by the CPU 141, the encryption circuit 130 operates using the voltage "$V_{DES}$" that is generated from the electromotive force generated in the metal antenna 110. The voltage $V_{DES}$ is separated from the external-power-supply voltage $V_{cc}$.

Accordingly, a leakage current caused by encryption arithmetic does not appear on the second power-supply line LV141 for the external-power-supply voltage $V_{cc}$. It is difficult to obtain a waveform of a consumed current including the leakage current.

Figure 8:
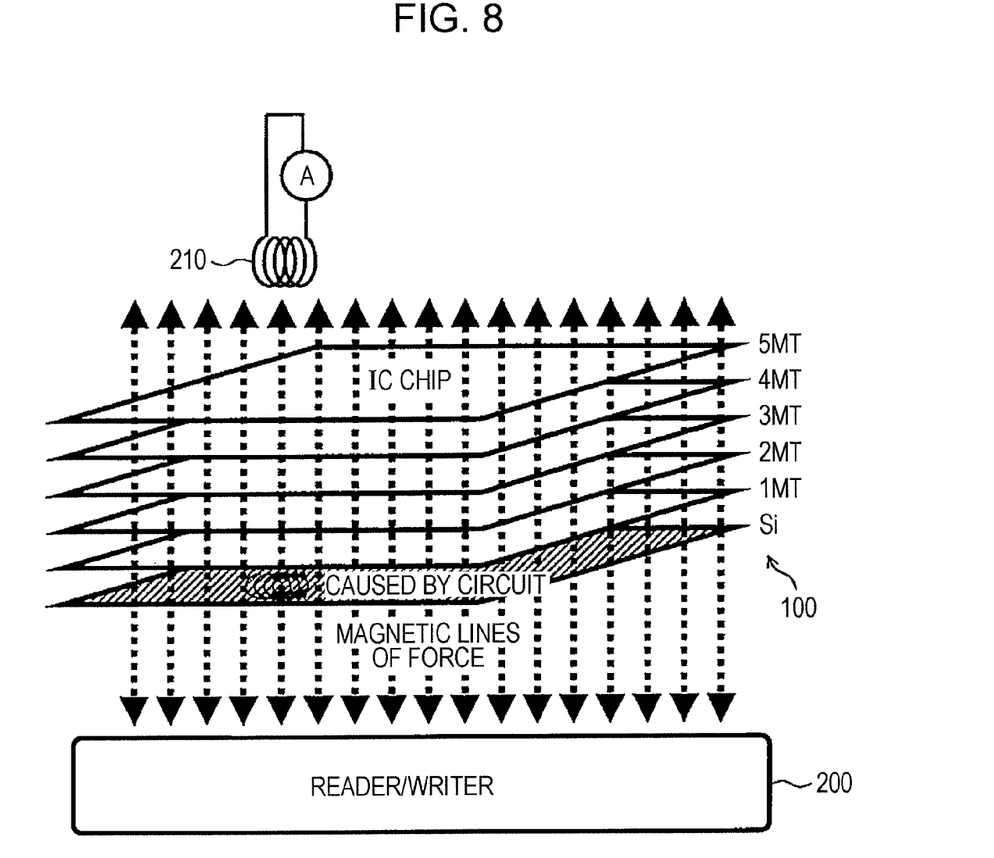
FIG. 8 is a diagram for explaining a feature of resistance to the DEMA attack in the first embodiment.

Furthermore, when the DPA attack is performed on the IC chip, it is necessary to provide the external-power-supply voltage $V_{cc}$ to the second power-supply line LV141, and to also dispose a source of magnetic lines of force such as a reader/writer apparatus 200 as illustrated in FIG. 8.

If no source of magnetic lines of force is disposed, no electromotive force is generated in the metal antenna 110. As a result, because the voltage $V_{DES}$ that is a power-supply voltage for the encryption circuit 130 becomes zero, the encryption circuit 130 does not operate. A leakage current, which is a target of the DPA attack, is also not generated.

On the other hand, in a case of the DEMA attack, as illustrated in FIG. 8, minute magnetic lines of force caused by an operating current of the encryption circuit 130 are obtained by a coil 210, and a statistical process is performed.

However, in the configuration in the first embodiment, in order to cause the encryption circuit 130 to operate, it is necessary to dispose a source of magnetic lines of force near the IC chip. Because of influence of the source of the magnetic lines of force (noise), it is very difficult to obtain a signal indicating the minute magnetic lines of force caused by the operating current of the encryption circuit 130.

Even when the signal indicating the minute magnetic lines of force has been obtained, the signal-to-noise (S/N) ratio is significantly low. It is very difficult to extract a key using a statistical process.

2. Second Embodiment

Figure 9:
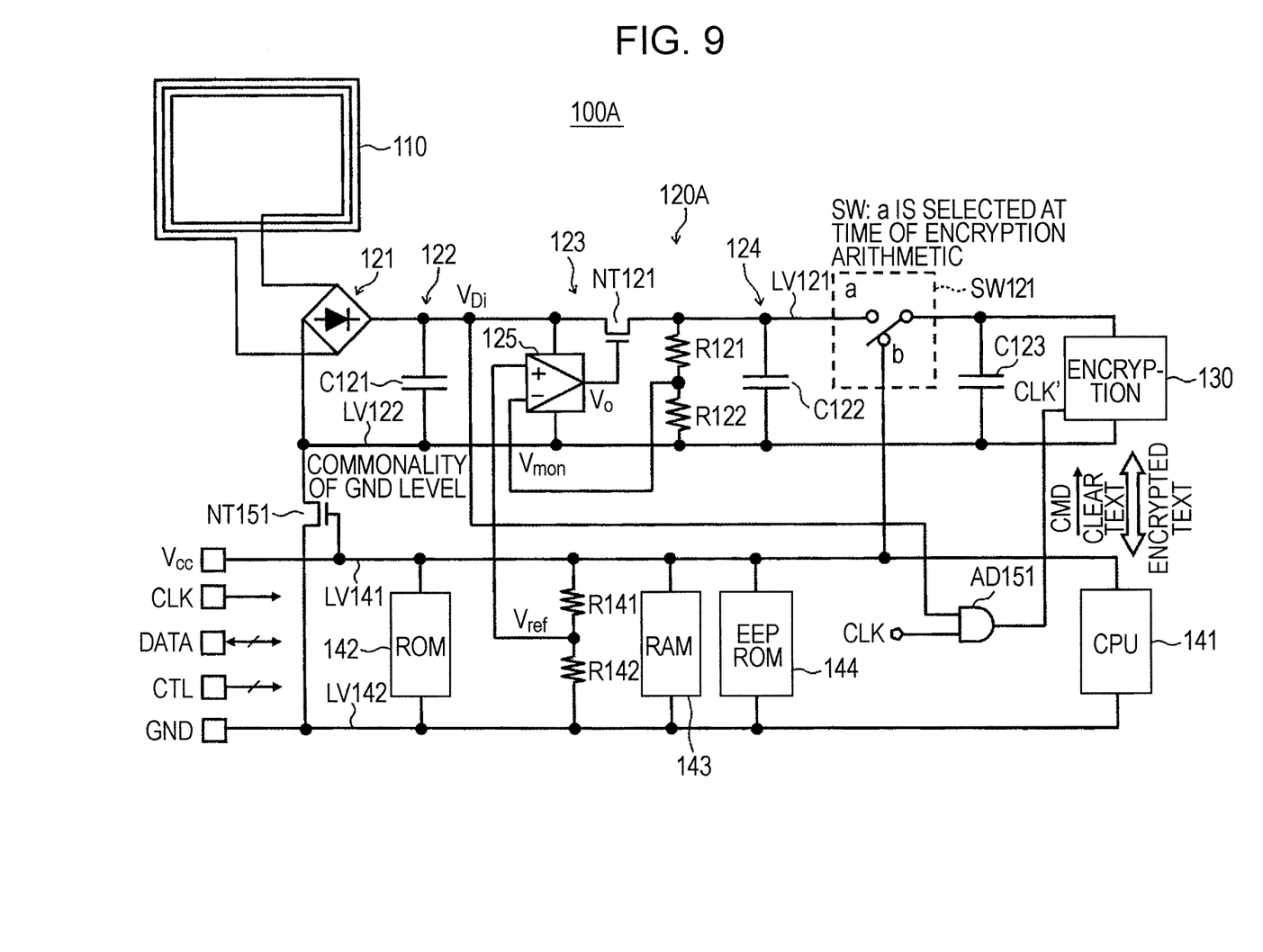
FIG. 9 is a diagram illustrating a configuration of a more specific circuit for generating a constant voltage in a security LSI according to a second embodiment.

FIG. 9 is a diagram illustrating a configuration of a more specific circuit for generating a constant voltage in a security LSI according to a second embodiment.

When a security LSI 100A according to the second embodiment is compared with the security LSI 100 according to the first embodiment, the differences therebetween are as follows.

Firstly, a configuration is used, in which the power supply for supplying power to the encryption circuit 130 can be switched using a switch SW121 between the power supply (a terminal a side) that provides a voltage which is generated as a constant voltage from the electromotive force generated in the metal antenna 110 and the external power supply (a terminal b side).

Secondly, an external input clock signal CLK and a voltage $V_{Di}$ generated from the electromotive force generated in the metal antenna 110 are input to an AND circuit AD151, and an AND signal, which is output from the AND circuit AD151, of the external input clock signal CLK and the voltage $V_{Di}$ is input as a clock to the encryption circuit 130.

In the switch SW121 disposed on the first power-supply line LV121, the "terminal b" is selected to establish connection in a time period in which the encryption circuit 130 is not operating. A capacitor C123, which is disposed in parallel to the encryption circuit 130, is charged by a current flowing from the second power-supply line LV141 (the external power supply).

During this time period, magnetic lines of force are converted to the electromotive force in the metal antenna 110. The electromotive force is rectified to obtain a voltage. The voltage is smoothed, and a constant voltage is generated from the smoothed voltage. The capacitor C122 is charged by the constant voltage.

Then, the "terminal a" is selected in the switch SW121 to establish connection by issuing the encryption command with the CPU 141.

After that, at a time of encryption arithmetic, the encryption arithmetic is performed using charge accumulated in the capacitors C123 and C122. In order to compensate for charge consumed in the encryption arithmetic, the capacitors are recharged using the electromotive force generated in the metal antenna 110. In this manner, control is performed so that the encryption circuit 130 will operate.

Accordingly, the encryption arithmetic, which is a target of the DPA attack, is performed using charge accumulated in the capacitors C123 and C122 and using the power supply that provides a voltage which is generated as a constant voltage from the electromotive force generated in the metal antenna 110. Thus, a leakage current does not appear at the power-supply terminal.

Furthermore, regarding the voltage that is generated from the electromotive force generated in the metal antenna 110, it is only necessary to compensate for reduction in the voltage that is caused by the encryption arithmetic. Thus, the size of the metal antenna can be reduced, compared with that of the metal antenna in the first embodiment.

Here, when no magnetic line of force is provided to the IC chip, no power is supplied from a power-supply system including the metal antenna 110.

Accordingly, no charge is accumulated in the capacitor C122. However, when, by issuing the encryption command, the "terminal a" is selected in the switch SW121 to establish connection, the capacitor C122 is charged using charge accumulated in the capacitor C123 because of redistribution of charge.

In this manner, a voltage across the capacitor C122 is increased every time the encryption command is issued, and a voltage that is redistributed at a time of issuance of the encryption command is gradually increased.

Then, when the encryption command is issued after the encryption has already been issued plural times, encryption arithmetic in first several rounds that are targets of the DEMA attack is correctly performed. There is a probability that a signal indicating magnetic lines of force associated with an encryption operation will be obtained.

In order to prevent the signal indicating magnetic lines of force associated with an encryption operation from being obtained, for example, the AND signal of the voltage $V_{Di}$, which is obtained by rectifying and smoothing the electromotive force generated in the metal antenna 110, and the clock signal CLK, which is supplied from an external device, is input as a clock CLK' to the encryption circuit 130. Accordingly, when no magnetic line of force is provided, control is performed so that the encryption circuit will not be caused to operate.

Also in the second embodiment, it is difficult to perform test associated with the encryption circuit in a state in which it is not possible to provide magnetic lines of force, such as a state in which the IC chips are formed on a wafer.

In order to prevent the test associated with the encryption circuit from not being performed, selection of the "terminal b" is fixed in the switch SW121 in processes prior to a certain process before shipment. In the certain process before shipment, control can be performed so that switching from the "terminal b" to the "terminal a" will be performed in an irreversible manner for a case of encryption arithmetic.

Also in the second embodiment, in order to cause the encryption circuit to operate, it is necessary to cause the IC chip to operate in a state in which magnetic lines of force are generated as illustrated in FIG. 8. For this reason, even when obtaining of minute magnetic lines of force caused by a circuit operation is attempted, because of influence of magnetic lines of force provided from an external device, it is difficult to obtain a waveform of a signal indicating the minute magnetic lines of force that is necessary for the DEMA attack.

As described above, in the second embodiment, the following positive effects can be obtained.

The power supply for the encryption circuit is not connected to the power-supply terminal of the IC chip. Accordingly, a leakage current does not appear at the power-supply terminal. Thus, the DPA attack is extremely difficult.

In order to cause the encryption circuit to operate, it is necessary to bring the IC chip near to a source of magnetic lines of force. Accordingly, it is difficult to obtain a waveform of a signal indicating minute magnetic lines of force associated with changes in signals of the encryption circuit. Thus, the DEMA attack is extremely difficult.

The present application contains subject matter related to that disclosed in Japanese Priority Patent Application JP 2009-217482 filed in the Japan Patent Office on Sep. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An integrated circuit comprising:
a semiconductor-circuit layer;
metal layers formed on the semiconductor-circuit layer, one of the metal layers being a metal layer in which an active shield is formed; and
an antenna formed by patterning in at least one of the metal layers that are below the metal layer in which the active shield is formed,
the semiconductor-circuit layer including
an encryption circuit configured to receive a drive voltage and to perform encryption arithmetic,
a power-supply circuit configured to provide the drive voltage to the encryption circuit, and
a circuit system configured to receive a power-supply voltage from an external power supply,
wherein the antenna is formed in the at least one of the metal layers positioned between the metal layer in which the active shield is formed and the semiconductor-circuit layer which includes the encryption circuit and the power-supply circuit.

2. The integrated circuit according to claim 1, wherein the power supply circuit includes
a rectifying circuit that is connected to the antenna, and that is configured to rectify electromotive force which has been generated in the antenna,
a smoothing circuit configured to smooth an output of the rectifying circuit to obtain a voltage,
a constant-voltage-generating circuit configured to generate a voltage as a constant voltage from the voltage which has been smoothed by the smoothing circuit so that the generated voltage and the power-supply voltage from the external power supply are the same potential, and
a stabilization unit configured to stabilize the voltage that has been generated as a constant voltage by the constant-voltage-generating circuit, and configured to supply the stabilized voltage as the drive voltage to the encryption circuit.

3. The integrated circuit according to claim 2,
wherein the power-supply circuit includes
a first power-supply line and
a first reference-power-supply line, and
the rectifying circuit includes
a first output terminal connected to the first power-supply line and
a second output terminal connected to the first reference-power-supply line, and
wherein the circuit system includes
a second power-supply line connected to the external power supply and
a second reference-power-supply line connected to an external reference power supply, and
wherein the constant-voltage-generating circuit of the power-supply circuit includes
a comparator configured to compare a first voltage with a second voltage, the first voltage being obtained by dividing a terminal voltage between the first power-supply line and the first reference-power-supply line, the second voltage being obtained by dividing a terminal voltage between the second power-supply line and the second reference-power-supply line, and a transistor which is disposed on the first power-supply line, and whose control terminal is connected to an output of the comparator.

4. The integrated circuit according to claim 3, wherein, when the first voltage is lower than the second voltage in the constant-voltage-generating circuit, the transistor is turned on by a signal which is output from the output of the comparator so that the constant-voltage-generating circuit supplies charge to the stabilization unit, and wherein, when the first voltage is higher than the second voltage in the constant-voltage-generating circuit, the transistor is turned off by a signal which is output from the output of the comparator so that the constant-voltage-generating circuit stops supply of charge to the stabilization unit.

5. The integrated circuit according to claim 1, wherein the power-supply circuit includes
a first power-supply line and
a first reference-power-supply line, and
the rectifying circuit includes
a first output terminal connected to the first power-supply line and
a second output terminal connected to the first reference-power-supply line, and
wherein the circuit system includes
a second power-supply line connected to the external power supply and
a second reference-power-supply line connected to an external reference power supply, and
wherein the first power-supply line on an output side of the stabilization unit and the second power-supply line are connected to each other via a transistor whose control terminal is connected to a line through which a test signal is supplied.

6. The integrated circuit according to claim 1, further comprising:

a capacitor connected to the encryption circuit in parallel, the encryption arithmetic being performed using charge accumulated in the capacitor and the drive voltage provided by the power supply circuit, without generating a leakage current at a power-supply terminal of the encryption circuit;

a switch configured to be capable of selectively providing, to the capacitor and the encryption circuit, the voltage that has been generated and stabilized by the power-supply circuit or the power-supply voltage from the external power supply, wherein, when encryption arithmetic is being performed in the encryption circuit, the switch provides the voltage that has been generated and stabilized by the power-supply circuit to the capacitor and the encryption circuit, and wherein, except when the encryption arithmetic is being performed, the switch provides, to the capacitor and the encryption circuit, the power-supply voltage from the external power supply.

7. The integrated circuit according to claim 6, wherein an AND signal of a voltage generated from electromotive force which has been generated in the antenna and an external input clock signal is input as a clock to the encryption circuit.

8. The integrated circuit according to claim 1, wherein the power-supply circuit includes
a first power-supply line and
a first reference-power-supply line, and
the rectifying circuit includes
a first output terminal connected to the first power-supply line and
a second output terminal connected to the first reference-power-supply line, and
wherein the circuit system includes
a second power-supply line connected to the external power supply and
a second reference-power-supply line connected to an external reference power supply, and
wherein the second output terminal of the rectifying circuit and the second reference-power-supply line are connected to each other via a transistor whose control terminal is connected to the second power-supply line.

9. An electronic apparatus comprising an integrated circuit including an encryption circuit, the integrated circuit including
a semiconductor-circuit layer;
metal layers formed on the semiconductor-circuit layer, one of the metal layers being a metal layer in which an active shield is formed; and
an antenna formed by patterning in at least one of the metal layers that are below the metal layer in which the active shield is formed,
the semiconductor-circuit layer including
an encryption circuit configured to receive a drive voltage and to perform encryption arithmetic,
a power-supply circuit configured to provide the drive voltage to the encryption circuit, and
a circuit system configured to receive a power-supply voltage from an external power supply,
wherein the antenna is formed in the at least one of the metal layers positioned between the metal layer in which the active shield is formed and the semiconductor-circuit layer which includes the encryption circuit and the power-supply circuit.

* * * * *